(12) United States Patent
Panse et al.

(10) Patent No.: US 11,038,889 B2
(45) Date of Patent: Jun. 15, 2021

(54) SYSTEM AND METHOD FOR MIGRATING EXISTING ACCESS CONTROL LIST POLICIES TO INTENT BASED POLICIES AND VICE VERSA

(71) Applicant: Cisco Technology, Inc., San Jose, CA (US)

(72) Inventors: Parag M. Panse, Sunnyvale, CA (US); Brian Russell Kean, Cincinnati, OH (US); Sanjay Kumar Hooda, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 264 days.

(21) Appl. No.: 16/368,695

(22) Filed: Mar. 28, 2019

(65) Prior Publication Data

US 2020/0162467 A1   May 21, 2020

Related U.S. Application Data

(60) Provisional application No. 62/770,101, filed on Nov. 20, 2018.

(51) Int. Cl.
*H04L 29/06* (2006.01)
*H04L 12/46* (2006.01)

(52) U.S. Cl.
CPC ........ *H04L 63/101* (2013.01); *H04L 12/4641* (2013.01); *H04L 63/104* (2013.01); *H04L 69/04* (2013.01)

(58) Field of Classification Search
CPC .................................................. H04L 63/101
USPC .......................................................... 726/3
See application file for complete search history.

(56) References Cited

U.S. PATENT DOCUMENTS

| | | | |
|---|---|---|---|
| 7,624,424 B2 | 11/2009 | Morita et al. | |
| 7,707,642 B1 * | 4/2010 | Herbach | G06F 21/6227 726/27 |
| 9,369,431 B1 * | 6/2016 | Kirby | H04L 63/0218 |
| 9,736,185 B1 * | 8/2017 | Belamaric | H04L 61/1511 |

(Continued)

FOREIGN PATENT DOCUMENTS

CN           101459576           7/2013

OTHER PUBLICATIONS

Merriam-Webster, "canonical", 2021 (Year: 2021).*

(Continued)

*Primary Examiner* — Ondrej C Vostal
(74) *Attorney, Agent, or Firm* — Polsinelli PC

(57) ABSTRACT

Present technology is directed to a system and method for implementing an offline scheme to automatically and efficiently transform a set of conventional IP-based Access Control Entries in a supplied configuration into compressed form that can then be represented as Object-Group based Access Control Entries. The compression is performed on contiguous blocks of the supplied Access Control List having a common prescribed filtering access. The compression is performed by iteratively selecting a data field with mismatching data values across the ACEs and merging the data values into a corresponding data field of the output ACE. The common values of other data fields are then imported to the corresponding data fields of the output ACE. The process is repeated in an iterative manner by assigning a different data field as the selected data field for each iteration round.

20 Claims, 11 Drawing Sheets

(56) References Cited

U.S. PATENT DOCUMENTS

| | | | |
|---|---|---|---|
| 2006/0072456 A1* | 4/2006 | Chari | H04L 63/0227 370/230 |
| 2007/0209058 A1* | 9/2007 | Anantharamiah | H04L 41/0806 726/1 |
| 2008/0037539 A1* | 2/2008 | Paramaguru | H04L 45/742 370/392 |
| 2008/0104665 A1* | 5/2008 | Naldurg | G06F 21/577 726/2 |
| 2009/0271863 A1* | 10/2009 | Govindavajhala | H04L 63/1433 726/23 |
| 2011/0153854 A1* | 6/2011 | Chickering | H04L 67/146 709/229 |
| 2013/0305354 A1* | 11/2013 | King | G06F 21/31 726/19 |
| 2014/0029845 A1* | 1/2014 | Lin | H04N 19/12 382/166 |
| 2014/0298481 A1* | 10/2014 | Gilroy | G06F 21/604 726/27 |
| 2015/0089052 A1* | 3/2015 | Lin | H04L 69/04 709/224 |
| 2015/0135331 A1* | 5/2015 | Das | G06F 21/6218 726/27 |
| 2018/0176252 A1* | 6/2018 | Nimmagadda | H04L 41/0893 |
| 2018/0278480 A1 | 9/2018 | Prasad et al. | |

OTHER PUBLICATIONS

Wikipedia, "Canonical", 2021 (Year: 2021).*

International Search Report and Written Opinion from the International Searching Authority, dated Mar. 19, 2020, 13 pages, for corresponding International Patent Application No. PCT/US2019/060586.

Zhang, Lin, et al., "A Firewall Rules Optimized Model Based on Service-Grouping," 2015 12$^{th}$ Web Information System and Application Conference, Sep. 11, 2015, pp. 142-146.

Liu, Alex X., et al., "Firewall Compressor: An Algorithm for Minimizing Firewall Policies," INFOCOM 2008, The 27$^{th}$ Conference on Computer Communications, IEEE, Apr. 13, 2008, pp. 691-699.

Liu et al., "Compressing Network Access Control Lists," 27th Annual IEEE Conference on Computer Communications (INFOCOM), Apr. 2008, pp. 1-13.

Daly et al., "A Difference Resolution Approach to Compressing Access Control Lists," 32nd Annual IEEE International Conference on Computer Communications (INFOCOM), Apr. 2013, pp. 1-14.

* cited by examiner

200

| Initial condition (count = 9) | | | |
|---|---|---|---|
| SA | SP | DA | DP |
| a | x | b | c |
| a | y | b | c |
| a | z | b | c |
| a' | x | b | c |
| a' | y | b | c |
| a' | z | b | c |
| a' | x | b' | c |
| a' | y | b' | c |
| a' | z | b' | c |

Fig. 2

SYSTEM AND METHOD FOR MIGRATING EXISTING ACCESS CONTROL LIST POLICIES TO INTENT BASED POLICIES AND VICE VERSA

CROSS-REFERENCE TO RELATED APPLICATIONS

This application claims priority to U.S. Provisional Patent Application No. 62/770,101, filed on Nov. 20, 2018, the content of which is incorporated herein by reference in its entirety.

TECHNICAL FIELD

The present technology pertains to systems and methods for management of network security policies. More specifically it is directed to network security implementation for intent-based policies.

BACKGROUND

Access Control policies have been traditionally implemented using IP based Access Control Lists (ACLs). An IP based ACL is a sequential collection of permit and deny conditions that apply to an IP packet. A router tests packets against the conditions in the ACL one at a time. The first match determines whether packet is forwarded or discarded. However in intent-based network management centers such as Cisco's Digital Network Architecture Centers (DNA-C) clients may be configuring security policy via an intent based mechanism. In such instances, previously provisioned network devices being migrated to the intent-based management center (i.e., DNA-C) may be carrying conventional security policy configuration expressed, for example, as a conventional IP based ACLs. There needs to be a tool or a set of tools to migrate existing security policy to the intent based policy.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates a set of canonical Access Control Entries, in accordance with some embodiments of the present technology.

DESCRIPTION OF EXAMPLE EMBODIMENTS

Figure 1:
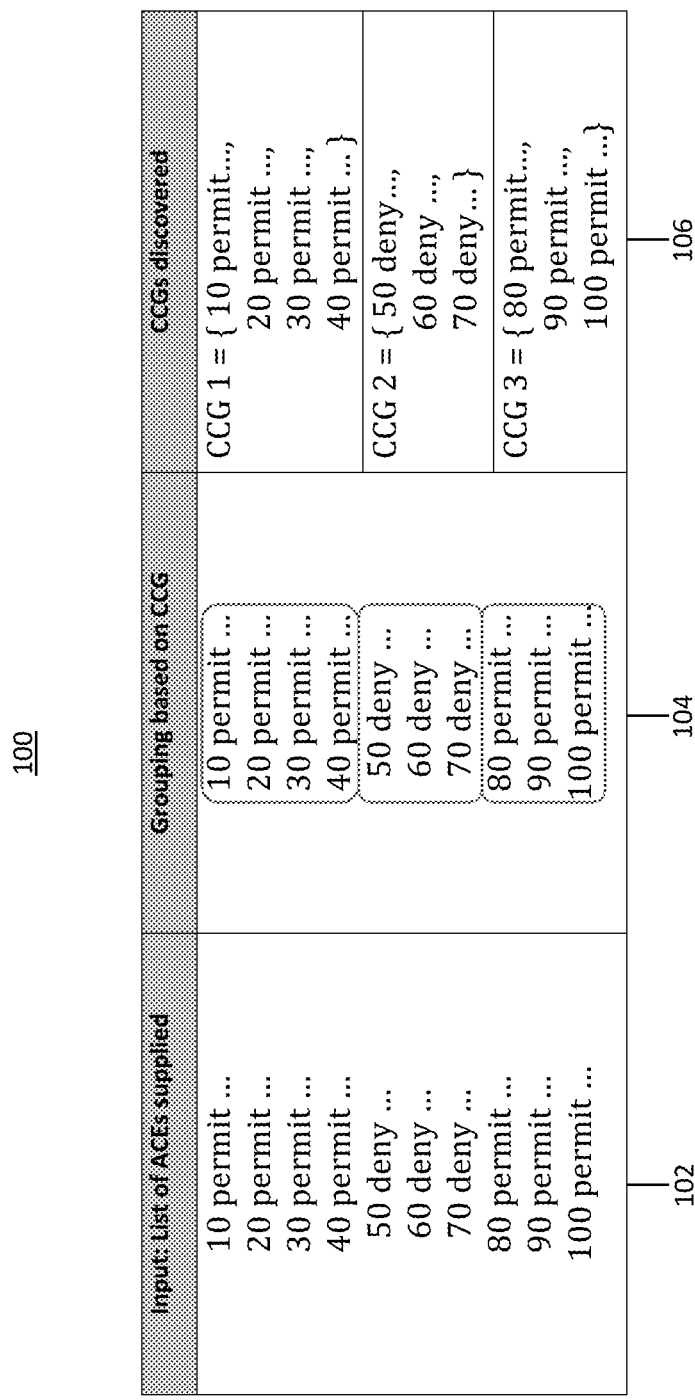
FIG. 1 illustrates a grouping of Access control Entries into Candidate Compression Groups, in accordance with some embodiments of the present technology.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, methods, and computer-readable media for dynamic conversion of conventional IP-based Access Control Entries in a supplied Access Control List configuration based on using an iterative compression scheme that may be applied to the supplied Access Control Entries in an offline environment. An iterative application of the compression scheme to a supplied set of IP-based Access control Entries results in the formation of one or more compressed Access control entries. The one or more compressed Access Control Entries may be represented as one or more Object Group based or Security-Group based Access Control Entries by an assignment of relevant object-group or security groups tags for representing the content of one or more data fields associated with the one or more compressed Access control entries.

In one aspect of the present technology, a method includes grouping a plurality of canonical Access Control entries (ACEs), each comprising a plurality of data fields, into one or more candidate compression groups (CCGs); identifying, in each of the one or more CCGs, a plurality of equivalent canonical ACEs corresponding to a plurality of mismatching data values across a designated data field and a same data value across a plurality of remaining data fields; and merging together, in each of the one or more CCGs, the plurality of equivalent canonical ACEs in an iterative manner by varying the designated data field, to thereby convert the plurality of canonical ACEs, in each of the one or more CCGs, into one or more Object-group based or one or more security-group based ACEs.

DETAILED DESCRIPTION

One way to represent an intent-based security policy is through Object Group based Access Control Lists (OG-ACL). For example, users/devices may be grouped per some grouping policy. These groups may then be allowed/disallowed to access applications. This may be expressed as a set of one or more Object Group based Access Control Entries.

Some embodiments of the present technology are directed to an offline method and tool for converting a conventional IP based Access Control List (ACL) to Object Group-based ACL. A network object group may contain a single object (such as a single IP address, a hostname, another network object group, or a subnet) or multiple objects (such as a combination of multiple IP addresses, hostnames, a range of IP addresses, other object network groups, or subnets). Object Groups may be used with an Access Control List (ACL) in a network object group-based ACL, to create access control policies for the objects.

Accordingly, Object Groups for ACLs enable consolidation of users, devices, or protocols into groups which can then be applied to access control lists (ACLs) to thereby create access control policies for the aforementioned groups. This feature enables the use of object groups instead of individual IP addresses, protocols, and ports, which are used in conventional ACLs. Although an Object-Group based ACL may have multiple Access Control Entries (ACEs), each single ACE in an Object-Group-based ACL may define an access control policy for an entire group of users to access a group of servers or services or to deny them from doing so.

Object-Group based ACLs may furthermore improve network performance as compared with conventional IP-based ACLs, especially in situations of heavy inbound and outbound packet traffic. Additionally, Object-Groups based Access Control Entries (OG-ACEs) may obviate the need to define an individual Access Control Entry (ACE) for every address and protocol pairing and therefore reduce the storage needed in Non Volatile Random Access Memory (NVRAM). This is particularly advantageous in large configuration files.

Moreover, in large networks, the number of ACLs can be large (hundreds of lines) and difficult to configure and manage, especially if the ACLs frequently change. Object Group based ACLs, on the other hand, are smaller, more readable, and easier to configure and manage than conventional ACLs. Accordingly, Object-Group based ACLs simplify both static and dynamic ACL deployments for large user access environments.

Object-Group ACL may be used to represent intent based security policy. For example, Users/devices can be grouped in accordance to a particular grouping policy. These groups may then be allowed/disallowed access to network applications and resources. This form of security policy may be represented as Object Group-based Access Control Entries (OG-ACEs) which may then be influenced by user-initiated input(s) to generate a Security-Group based Access Control List (SG-ACL). Some embodiments of the present technology describe a system and method for automated conversion of pre-existing traditional IP ACLs into Object-Group and/or Security-Group based ACLs for a device being migrated onto an intent-based platform.

In accordance with some embodiments of the present technology, any IP-based ACL that may be supplied to the DNA-C may be dynamically converted into Object Group based ACL and pushed onto the relevant network devices. This approach will save space on the limited, high performance ternary content-addressable memory (TCAM is a specialized type of high-speed memory that searches its entire contents in a single clock cycle) on switches and reduce the transaction cost between the DNA-C and the switches (i.e., because of lower batch size).

One aspect of the present technology involves examinations of equivalency patterns among various Access Control Entries in a supplied ACL to facilitate a compression of the ACL content. One challenge in accomplishing this stems from the syntactic and semantic variations in the way Access Control Entries (ACEs) are represented in the traditional IP-based ACLs. IP-based ACLs may be represented in a Standard or extended formats which are associated with different syntax for representing an Access Control Entry (ACE). Additionally, un-specified data fields in an ACE may be assigned a default value or represented with keywords such as "any" which corresponds to all possible variations of data values for a particular data field. Furthermore, there may be multiple ways to express the Access Control Entry in the same IP-based ACL. For example the same Access Control policy is expressed by the four semantically different Access Control Entries below:

permit tcp any eq 80 host x.x.x.x gt 1023 (1)

permit tcp any eq 80 host x.x.x.x range 1024 65535 (2)

permit tcp any eq 80 host x.x.x.x gt 1023 established (3)

permit tcp any eq 80 host x.x.x.x range 1024 65535 established (4)

The same security intent (i.e., to Permit TCP connections on port 80 from any source host, represented by syntax "any", to the same destination host address/port) is expressed in four different ways by the Access Control Entries (1-4). Such syntax and semantic variations makes it difficult to discover equivalencies across Access Control Entries. Some embodiments of the present technology prescribe a canonical transformation of the supplied ACEs (i.e., from a supplied IP-based ACL configuration) for providing syntactic and semantic consistency in the way ACEs are represented.

In accordance with some embodiments of the present technology a canonical form for an Access Control Entry is defined with fields for the action to be performed <A>, the corresponding Protocol <P>, one or more Source IP Addresses <SA> and one or more source Port numbers <SP> along with one or more destination IP addresses <DA> and one or more destination port numbers <DP>. In the canonical representation of an Access Control Entry, every data field is explicitly specified (i.e., assigned a non-wildcard value) and some data fields may be expressed as a set of explicitly defined values. Once the Access Control Entries (ACEs) in a supplied IP-based ACL are represented in a canonical form, the conventional IP-based ACL may be transformed into an Object-Group based ACL, in accordance to a system and method disclosed by some embodiments of the present technology.

For the sake of illustrations, each canonically represented Access Control Entry (ACE) in an Access Control List (ACL) may be viewed as a row, with the different corresponding data fields (i.e., <SA>, <SP>, <DA>, <DP>) represented as different columns. The canonically represented ACEs may then be compressed into Object-Group based ACEs. The compression results from merging together rows with equivalent values in all except a selected column (i.e. a designated data field). Accordingly a plurality of input rows (input ACEs), characterized by matching field values (i.e. column values) across all columns excluding a designated column, may be collapsed or merged together into an output ACE (i.e. an output row). In the merging operation, the matching column values, across all the input rows, are represented as a single value in the corresponding data fields of the output row, while mismatching column values are represented as a set of different data values in the corresponding data field of the output row. The process may be iteratively repeated for each column or data field associated with the plurality of input rows such that the output of each round (i) serves as the input for the subsequent round (i+1). This may result in highly collapsed equivalent classes. The resulting equivalence classes may then be used to generate object group ACEs.

Traditional Access Control lists operate based on a first match filtering criteria. As such, in order to preserve the intended purpose and function of the Access Control List, the compression process as described above may not be arbitrarily applied across all Access Control Entries in a supplied Access Control List configuration without considering the placement of the Access Control Entries within the ACL. For example ACEs corresponding to opposite filtering Actions or ACEs that correspond to a same filtering action but are separated by one or more ACE's associated with the opposite filtering Action may not be compressed together. In order to overcome this issue, some embodiments of the present technology, provide a notion of a compression candidate group (CCG) in order to prevent from arbitrarily collapsing or merging together Access Control Entries (ACEs) which may result in a violation of the network administrator/operator intent. In accordance with some embodiments of the present technology, a compression candidate group (CCG) may consist of a set of contiguous ACEs (in a supplied ACL configuration) that prescribe the same action. Accordingly a Candidate Compression Group may end when the first ACE of the opposite Action is identified and a new Candidate Compression Group begins. In some embodiments, a fabric controller may perform CCG computation as a pre-processing step. A fabric controller may then, upon completing the CCG computation, perform the compression/merging operations, described above, on each pre-computed CCG separately. An example of computing Candidate Compression Group from a supplied ACL is provided in FIG. 1.

In FIG. 1, column 102 corresponds to a list of supplied Access Control Entries (ACEs) represented by an ACE identifier followed by a prescribed filtering action (i.e., permit or deny). Column 104 illustrates a grouping criteria, based on delineating contiguous portions prescribing a common filtering action, for computation of the candidate compression groups. The resulting Candidate Compression Groups, constituting contiguous portions of the supplied ACEs configuration, are specified in column 106 as CCG 1 CCG 2 and CCG 3. A fabric controller may then apply the compression process, as described above, to each Candidate Compression Group individually. A fabric controller may process each of the computed CCGs for compression either sequentially or in parallel.

An example of a compression process applied to the candidate compression groups in canonical form is shown in FIG. 2-FIG. 5.

Referencing FIG. 2 table 200 illustrates a set of ACEs in a Candidate Compression Group. The values used are merely for illustrating how the process works. For the sake of readability, table 200 assumes that action and protocol for the listed ACEs in table 200 are already matching and hence those columns are not shown. Successive ACE entries, illustrated in table 200, may be referred to as rows. Accordingly, a set of nine ACE rows with each column representing a distinct data field (i.e., Source Address data field <SA>, Source Port data field <SP>, Destination Address data field <DA> and Destination port data field <DP>) are illustrated in table 200. For the set of supplied ACEs in example of FIG. 2, the compression process may work in four rounds starting with <SA> column in round 1, SP column in round 2, DA column in round 3 and DP column in round 4. The column selected for a round may be referred to as the designated column. In each round, the compression process, running for example on a Network controller residing in a Cisco DNA™ Center, may collapse (or merge together) rows (i.e., ACE entries) that meet a compressibility criteria (interchangeably referred to as an equivalency criteria for the purposes of the present technology). The compressibility criteria for the example illustrated in FIG. 2-5A corresponds to mismatching data values for each row (ACE) along the designated column (i.e., in the designated data field of each ACE in the set of supplied ACEs) and an exact match in the data field values of each row along all other (non-designated) columns (i.e., in the remaining data fields of each ACE in the set of supplied ACEs).

The compressibility criteria based on an exact match along the non-designated columns (i.e., a same data value in the non-designated matching data fields of the ACEs in the set of supplied ACEs) is a criteria that may be selected by a user or a fabric controller. Once the controller running the compression routine has compressed or merged together all the ACEs, in a candidate compression group, that meet a compressibility criteria for a designated column, the controller will repeat the process by selecting a different designated column. As such, the outcome of each compression may be preserved to serve as the input for the next round of compression based on the next designated column. Outcome of each round may therefore be saved temporarily as an intermediate result.

Figure 3:
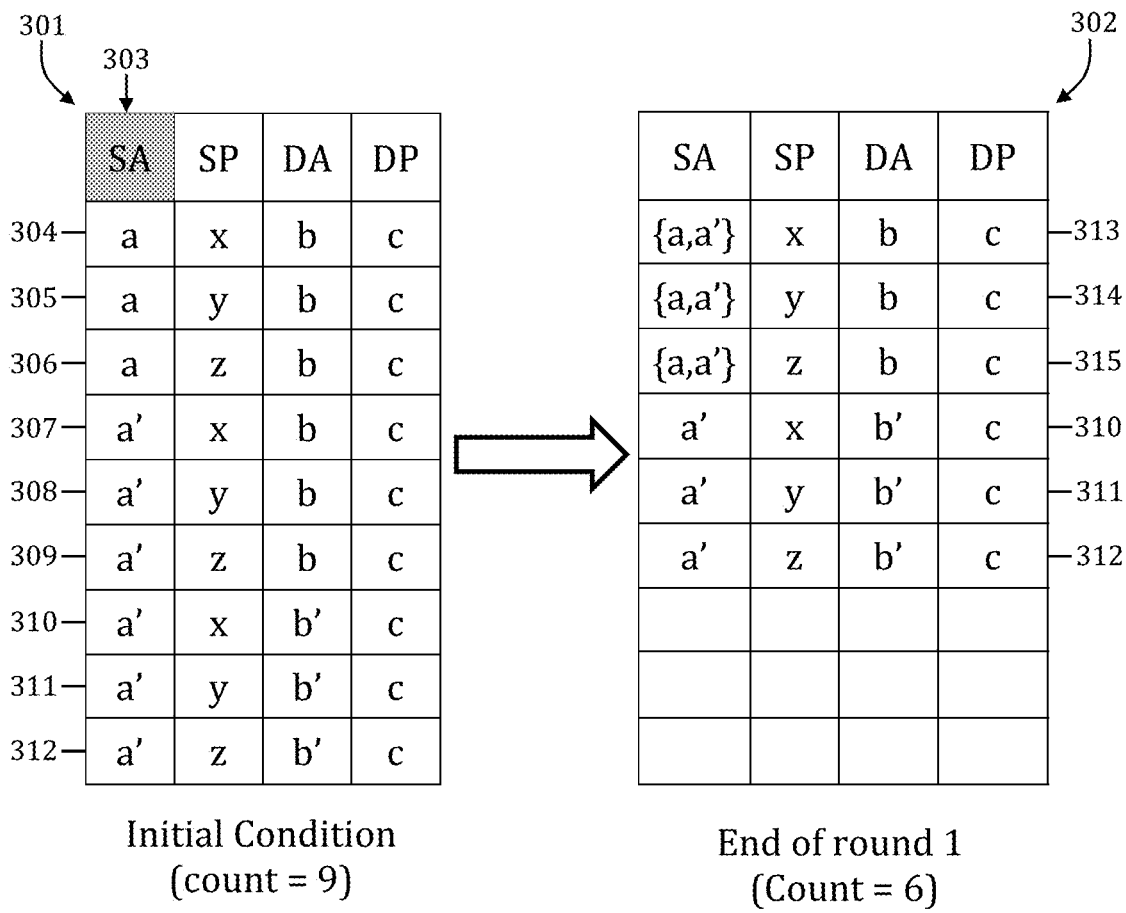
FIG. 3 illustrates a set of canonical Access Control Entries after a first round of compression, in accordance with some embodiments of the present technology.

FIG. 3 illustrates a candidate compression group (CCG) 301 and a set of resulting output ACEs 302 representing a temporary outcome of a first round of compression based on a designated column 303 corresponding to a Source Address <SA> data field. The temporary result of the first compression round (302) may be stored as temporary/intermediate result to serve as an input for a subsequent round of compression. To provide an example illustration of the first compression round, the disclosure turns back to the compression candidate group 301. In the CCG 301 rows 304 and 307 fit the criteria for compression as indicated by the mismatch between their corresponding designated column values. Therefore, a fabric controller running the compression routine may merge together the designated column values associated with rows (ACEs) 304 and 307. The result of the merger is shown by row 313 in the intermediate output table 302. Similarly, the controller, based on instructions of the compression routine, may combine rows 305 and 308 into row 314 and rows 306 and 309 into row 315. Rows 310-312 have identical entries in the selected (designated column) and hence cannot be compressed based on the selected column 303. As such rows 310-312 appear unchanged in the output table 302 at the end of the first compression round.

The first round compression process illustrate in FIG. 3 may also be characterized by a merging the data field values of rows 307,308 and 309, respectively into the corresponding data fields of rows 304, 305 and 306 and deleting rows 307, 308 and 309 as the result of the merger. As illustrated in FIG. 3 at end of the first round of compression, the nine Access Control Entries in the set of supplied ACEs 301 (also referenced as candidate compression group 301) may be equivalently represented by the six Access Control Entries in the temporary output set 302.

Figure 4:
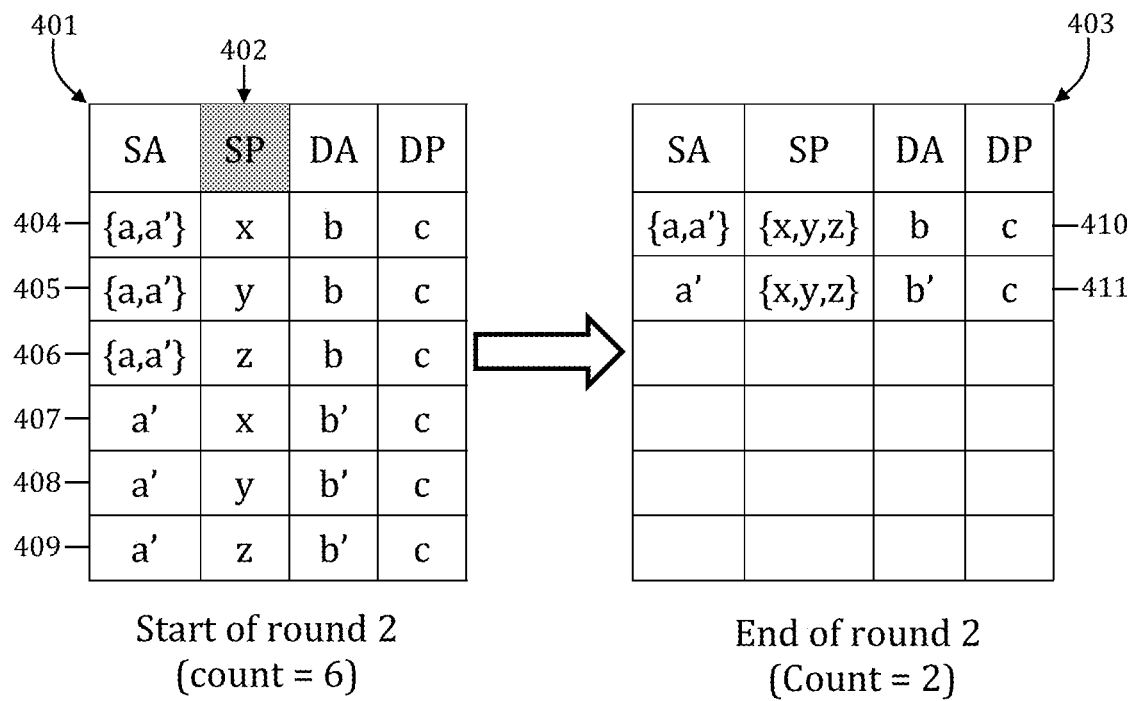
FIG. 4 illustrates a set of canonical Access Control Entries after a second round of compression, in accordance with some embodiments of the present technology.

FIG. 4 illustrates the compression result of round one referenced as table 401 in FIG. 4. The designated column 402, for the second round of compression corresponds to the Source Port <SP> data field. The temporary result of the second compression round may be stored as temporary/intermediate result as shown by the table 403. Coming back to table 401, Rows 404, 405 and 407 satisfy the compressibility criteria as their corresponding field values (i.e., column values) only differs across the designated column. Therefore, a fabric controller may merge together the designated column values associated with rows (ACEs) 404, 405 and 406 into a single row 410 in the intermediate output table 403. Moreover, rows 407, 408 and 409 also meet the compressibility criteria as they specify identical values across all Access Control Entry fields (columns) except the Source Protocol <SP> field (i.e., the designated column for round two). Consequently, a fabric controller may merge or combine rows 407, 408 and 409 into a single row 411 in the intermediate output table 403. As illustrated in FIG. 4 at end of the second round, nine Access Control Entries are compressed into two.

Figure 5:
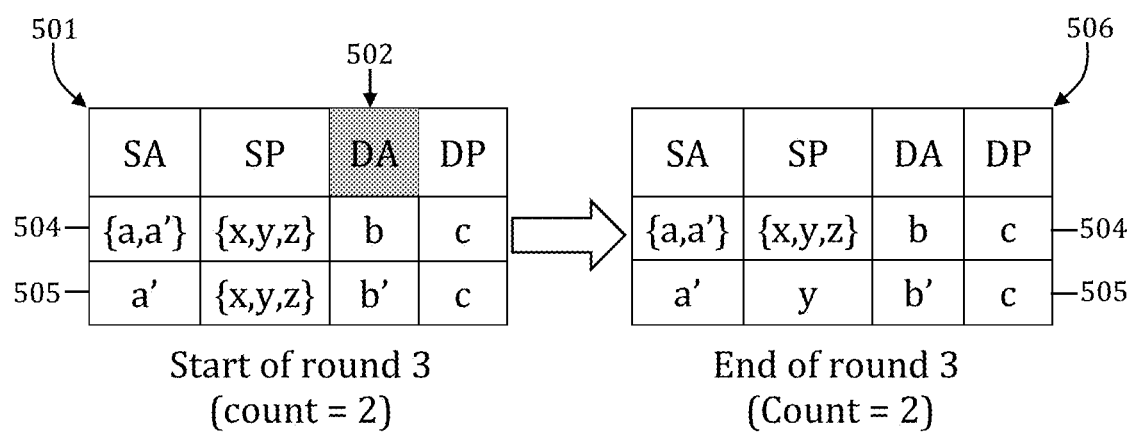
FIG. 5 illustrates a set of fully compressed canonical Access Control Entries based on an exact match equivalency criteria, in accordance with some embodiments of the present technology.

FIG. 5, the outcome of the second compression round (represented as table 501) is processed for compression based on the designated column 502 corresponding to the Destination Address <DA> ACE field. Inspecting the set of Access control Entries 504 and 505, it appears that a merger between the two rows (Access Control Entries) does not meet the criteria of an exact match between the value in every field (column) except that of the designated column. This is because the value specified in the Source Address column <SA> of 504 is {a, a'} while the corresponding value in the Source Address column <SA> of 505 is a'. As such, in accordance to the aforementioned criteria, ACE table 501 may not be compressed any further, in which case the final outcome of the compression process may be represented by ACE table 506.

As described, in accordance to some embodiments of the present technology, a controller or software service may compute one or more Candidate Compression Groups (CGGs) from the supplied configuration containing Access Control Entries. A controller may then perform the compression process on each of the Computed CCGs independently to transform each CCG into a compressed form that may be represented as one or more Object-Group based Access Control Entries. In accordance to some embodiments of the present invention an additional optimization step involving an optional pre-processing of the pre-computed CCGs may be carried out in order to identify any overlap amongst IP addresses in the neighboring ACEs of the pre-computed CCGs. This additional optimization step may result in enhanced compression results.

Figure 6:
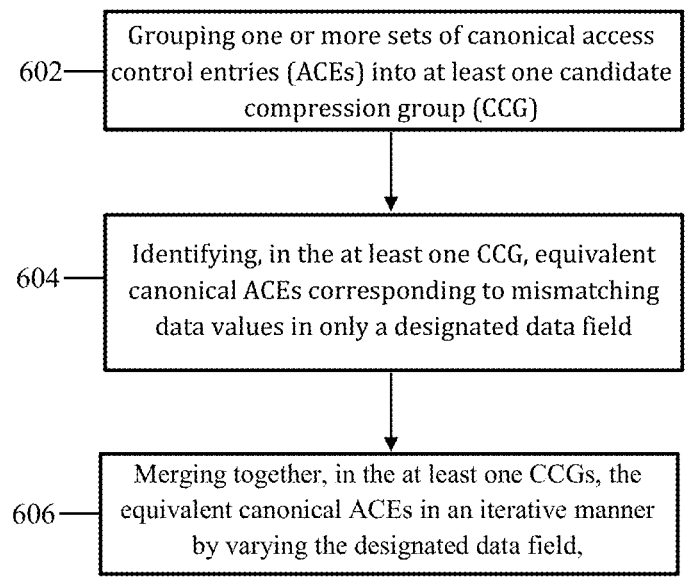
FIG. 6 illustrates an example operational flow for converting IP based Access Control List Entries into Object-Group based Access Control Entries, in accordance with some embodiments of the present technology.

FIG. 6 illustrates a flow chart for an example process 600 involving a conversion of a set of conventional IP-based Access Control Entries (ACEs) into a compressed format for representation as a set of one or more object-group based Access Control Entries (ACEs). The object-group based ACEs may then be expressed as intent-based Access Control security policies. The example process 600 comprises a step of grouping one or more sets of canonically represented IP-based Access Control Entries (ACEs) into one or more candidate compression groups (CCGs) as shown by step 602. The example process may then move to step 604 wherein a plurality of equivalent ACEs, in each Candidate Compression Group, are identified, based on a selection of a designated data field. In accordance with some embodiments of the present invention, equivalent ACEs may be characterized by equivalent data values in the matching data fields of the associated ACEs, with the exclusion of the designated data field which may corresponds to a different data value with respect to each equivalent ACE.

Subsequently, at step 606, the identified equivalent canonical ACEs in each of the CCGs are merged together in an iterative manner by varying the selection of the designated data field. The merging of two or more equivalent input ACEs into a single output ACE may involve combining the two or more dis-similar data values in the designated data field of the two or more equivalent input ACEs into a set of data values in the corresponding data field of the output ACE. Moreover, the equivalent data values across the (non-designated) matching data fields of the two or more equivalent input ACEs may be represented as a single data value in the corresponding data fields of the output ACE.

In accordance with some embodiments, a distinct Object Group identifier or tag may be assigned to each of one or more sets of data values specified in one or more data fields of one or more output ACEs, to thereby convert the plurality of canonically represented IP-based ACEs, in each of the one or more CCGs, into one or more Object-Group based Access Control Entries that may then be expressed as intent-based Access Control policy configurations.

In accordance with some embodiments, a distinct Security Group identifier or tag may be assigned to each of one or more sets of data values specified in one or more data fields of one or more output ACEs, to thereby convert the plurality of canonically represented IP-based ACEs, in each of the one or more CCGs, into one or more Security-Group based Access Control Entries (SG ACEs) that may then be expressed as intent-based Access Control policy configurations.

Some embodiments of the present technology describe a system and method to simplify the expression of security policy by facilitating a conversion from a network administrator intent expressed as Object Group or Security Group based Access Control policies to deployable ACL configuration and vice versa.

Some embodiments of the present technology are directed a method for parsing a security policy or Access Control configuration using a multi-stage algorithm, in such a way so as to generate an output representation which saves a lot of Ternary Content Addressable Memory (TCAM) space by compressing the input security/Access Control configuration using an intelligent algorithm.

In accordance with some embodiments, the present technology may be implemented in the context of a Cisco's Digital Network Architecture Center (DNA-C) which is a foundational controller and analytics platform for an intent-based enterprise network.

Figure 7:
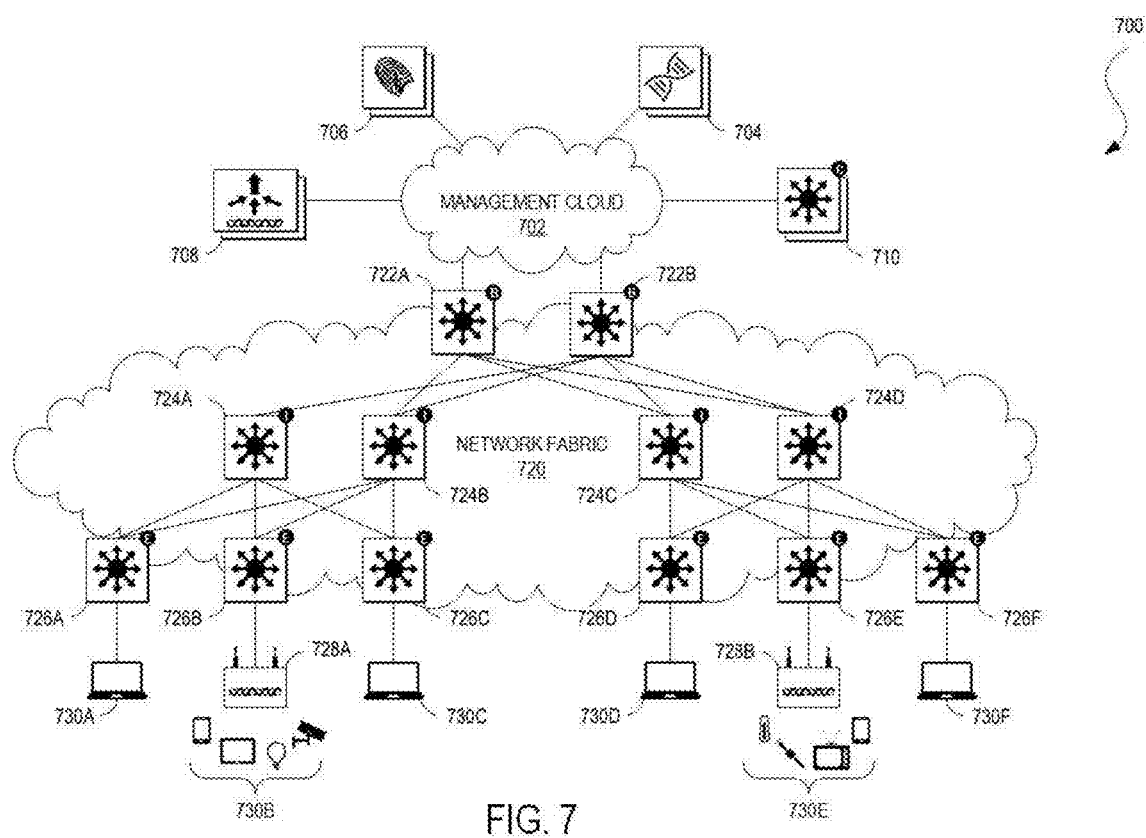
FIG. 7 illustrates an example of a physical topology of an enterprise network in accordance with some embodiments of the present invention.
Figure 8:
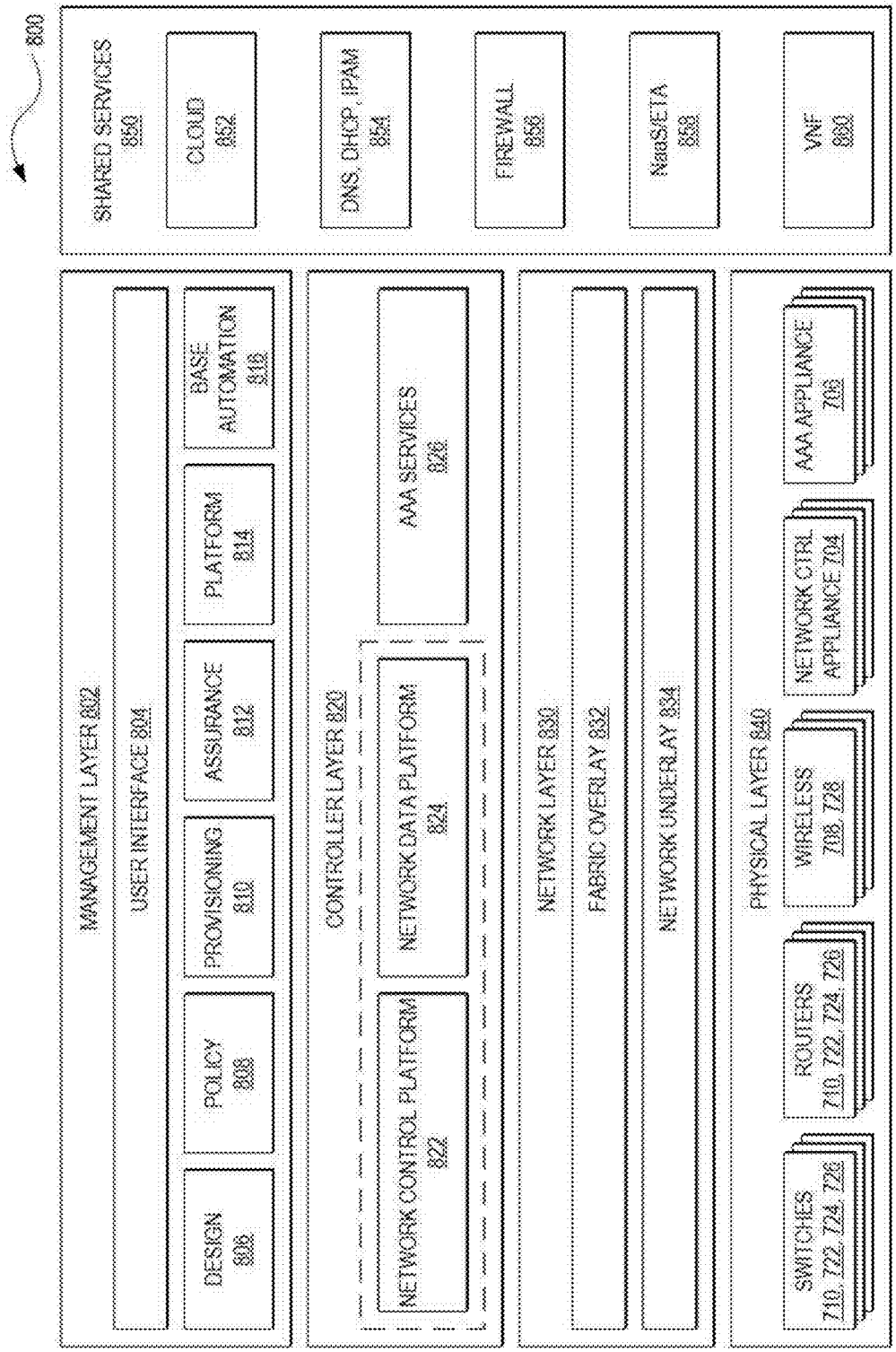
FIG. 8 illustrates an example of a logical architecture for an enterprise network in accordance with some embodiments of the present invention.
Figure 9:
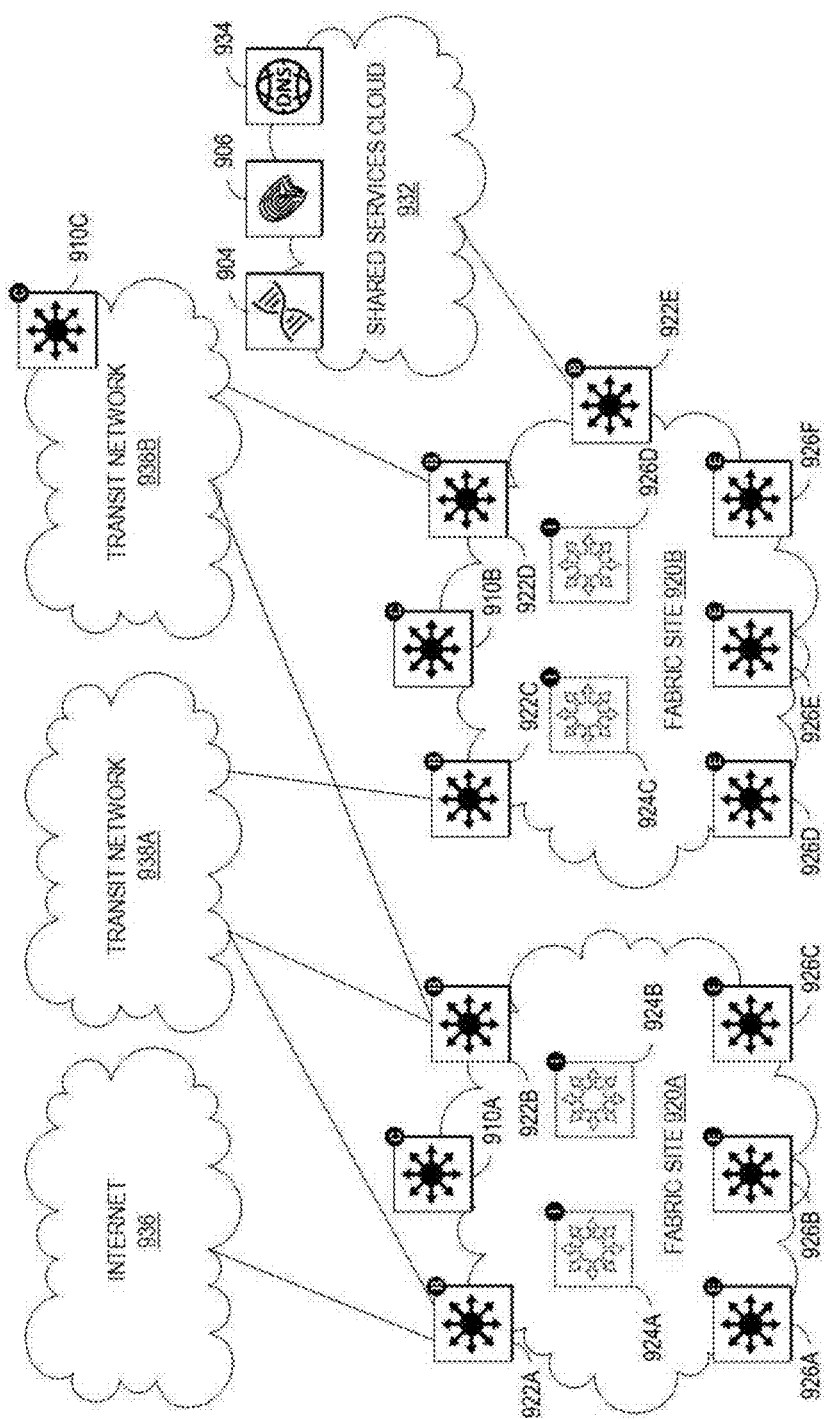
FIG. 9 illustrates an example of a physical topology for a multi-site enterprise network in accordance with some embodiments of the present invention.

The disclosure now turns to FIGS. 7, 8 and 9 to provide a structural and operational description of some aspects of DNA-C.

FIG. 7 illustrates an example of a physical topology of an enterprise network 700 for providing intent-based networking. It should be understood that, for the enterprise network 700 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 700 can include any number or type of resources, which can be accessed and utilized by endpoints or network devices. The illustrations and examples provided herein are for clarity and simplicity.

In this example, the enterprise network 700 includes a management cloud 702 and a network fabric 720. Although shown as an external network or cloud to the network fabric 720 in this example, the management cloud 702 may alternatively or additionally reside on the premises of an organization or in a colocation center (in addition to being hosted by a cloud provider or similar environment). The management cloud 702 can provide a central management plane for building and operating the network fabric 720. The management cloud 702 can be responsible for forwarding configuration and policy distribution, as well as device management and analytics. The management cloud 702 can comprise one or more network controller appliances 704, one or more authentication, authorization, and accounting (AAA) appliances 706, one or more wireless local area network controllers (WLCs) 708, and one or more fabric control plane nodes 710. In other embodiments, one or more elements of the management cloud 702 may be co-located with the network fabric 720.

The network controller appliance(s) 704 can function as the command and control system for one or more network fabrics and can house automated workflows for deploying and managing the network fabric(s). The network controller appliance(s) 704 can include automation, design, policy, provisioning, and assurance capabilities, among others, as discussed further below with respect to FIG. 8. In some embodiments, one or more Cisco Digital Network Architecture (Cisco DNA™) appliances can operate as the network controller appliance(s) 704.

The AAA appliance(s) 706 can control access to computing resources, facilitate enforcement of network policies, audit usage, and provide information necessary to bill for services. The AAA appliance can interact with the network controller appliance(s) 704 and with databases and directories containing information for users, devices, things, policies, billing, and similar information to provide authentication, authorization, and accounting services. In some embodiments, the AAA appliance(s) 706 can utilize Remote Authentication Dial-In User Service (RADIUS) or Diameter to communicate with devices and applications. In some embodiments, one or more Cisco® Identity Services Engine (ISE) appliances can operate as the AAA appliance(s) 706.

The WLC(s) 708 can support fabric-enabled access points attached to the network fabric 720, handling traditional tasks associated with a WLC as well as interactions with the fabric control plane for wireless endpoint registration and roaming. In some embodiments, the network fabric 720 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 708.

The network fabric 720 can comprise fabric border nodes 722A and 722B (collectively, 722), fabric intermediate nodes 724A-D (collectively, 724), and fabric edge nodes 726A-F (collectively, 726). Although the fabric control plane node(s) 710 are shown to be external to the network fabric 720 in this example, in other embodiments, the fabric control plane node(s) 710 may be co-located with the network fabric 720. In embodiments where the fabric control plane node(s) 710 are co-located with the network fabric 720, the fabric control plane node(s) 710 may comprise a dedicated node or set of nodes or the functionality of the fabric control node(s) 710 may be implemented by the fabric border nodes 722.

The fabric control plane node(s) 710 can serve as a central database for tracking all users, devices, and things as they attach to the network fabric 720, and as they roam around. The fabric control plane node(s) 710 can allow network infrastructure (e.g., switches, routers, WLCs, etc.) to query the database to determine the locations of users, devices, and things attached to the fabric instead of using a flood and learn mechanism. In this manner, the fabric control plane node(s) 710 can operate as a single source of truth about where every endpoint attached to the network fabric 720 is located at any point in time. In addition to tracking specific endpoints (e.g., /32 address for IPv4, /728 address for IPv6, etc.), the fabric control plane node(s) 710 can also track larger summarized routers (e.g., IP/mask). This flexibility can help in summarization across fabric sites and improve overall scalability.

The fabric border nodes 722 can connect the network fabric 720 to traditional Layer 3 networks (e.g., non-fabric networks) or to different fabric sites. The fabric border nodes 722 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 722 can also exchange reachability and policy information with fabric control plane nodes of different fabric sites. The fabric border nodes 722 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 724 can operate as pure Layer 3 forwarders that connect the fabric border nodes 722 to the fabric edge nodes 726 and provide the Layer 3 underlay for fabric overlay traffic.

The fabric edge nodes 726 can connect endpoints to the network fabric 720 and can encapsulate/de-capsulate and forward traffic from these endpoints to and from the network fabric. The fabric edge nodes 726 may operate at the perimeter of the network fabric 720 and can be the first points for the attachment of users, devices, and things and the implementation of policy. In some embodiments, the network fabric 720 can also include fabric extended nodes (not shown) for attaching downstream non-fabric Layer 2 network devices to the network fabric 720 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 726 for communication to outside subnets.

In this example, the network fabric can represent a single fabric site deployment which can be differentiated from a multi-site fabric deployment as discussed further below with respect to FIG. 9.

In some embodiments, all subnets hosted in a fabric site can be provisioned across every fabric edge node 726 in that fabric site. For example, if the subnet 10.10.10.0/24 is provisioned in a given fabric site, this subnet may be defined across all of the fabric edge nodes 726 in that fabric site, and endpoints located in that subnet can be placed on any fabric edge node 726 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 722, 724, and 726.

The enterprise network 700 can also include wired endpoints 730A, 730C, 730D, and 730F and wireless endpoints 730B and 730E (collectively, 730). The wired endpoints 730A, 730C, 730D, and 730F can connect by wire to fabric edge nodes 726A, 726C, 726D, and 726F, respectively, and the wireless endpoints 730B and 730E can connect wirelessly to wireless access points 728B and 728E (collectively, 728), respectively, which in turn can connect by wire to fabric edge nodes 726B and 726E, respectively. In some embodiments, Cisco Aironet® access points, Cisco Meraki® MR access points, and/or other Cisco DNA™-ready access points can operate as the wireless access points 728.

The endpoints 730 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 730 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 720 can support wired and wireless access as part of a single integrated infrastructure such that connectivity, mobility, and policy enforcement behavior are similar or the same for both wired and wireless endpoints. This can bring a unified experience for users, devices, and things that are independent of the access media.

In integrated wired and wireless deployments, control plane integration can be achieved with the WLC(s) 708 notifying the fabric control plane node(s) 710 of joins, roams, and disconnects by the wireless endpoints 730 such that the fabric control plane node(s) can have connectivity information about both wired and wireless endpoints in the network fabric 720, and can serve as the single source of truth for endpoints connected to the network fabric. For data plane integration, the WLC(s) 708 can instruct the fabric wireless access points 728 to form a VXLAN overlay tunnel to their adjacent fabric edge nodes 726. The AP VXLAN tunnel can carry segmentation and policy information to and from the fabric edge nodes 726, allowing connectivity and functionality identical or similar to that of a wired endpoint. When the wireless endpoints 730 join the network fabric 720 via the fabric wireless access points 728, the WLC(s) 708 can onboard the endpoints into the network fabric 720 and inform the fabric control plane node(s) 710 of the endpoints' Media Access Control (MAC) addresses. The WLC(s) 708 can then instruct the fabric wireless access points 728 to form VXLAN overlay tunnels to the adjacent fabric edge nodes 726. Next, the wireless endpoints 730 can obtain IP addresses for themselves via Dynamic Host Configuration Protocol (DHCP). Once that completes, the fabric edge nodes 726 can register the IP addresses of the wireless endpoint 730 to the fabric control plane node(s) 710 to form a mapping between the endpoints' MAC and IP addresses, and traffic to and from the wireless endpoints 730 can begin to flow.

FIG. 8 illustrates an example of a logical architecture 800 for an enterprise network (e.g., the enterprise network 700). One of ordinary skill in the art will understand that, for the logical architecture 800 and any system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 800 includes a management layer 802, a controller layer 820, a network layer 830 (such as embodied by the network fabric 720), a physical layer 840 (such as embodied by the various elements of FIG. 7), and a shared services layer 850.

The management layer 802 can abstract the complexities and dependencies of other layers and provide a user with tools and workflows to manage an enterprise network (e.g., the enterprise network 700). The management layer 802 can include a user interface 804, design functions 806, policy functions 808, provisioning functions 810, assurance functions 812, platform functions 814, and base automation functions 816. The user interface 804 can provide a user with a single point to manage and automate the network. The user interface 804 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or another suitable interface in which the user can configure network infrastructure, devices, and things that are cloud-managed; provide user preferences; specify policies, enter data; review statistics; configure interactions or operations; and so forth. The user interface 804 may also provide visibility information, such as views of a network, network infrastructure, computing devices, and things. For example, the user interface 804 can provide a view of the status or conditions of the network, the operations taking place, services, performance, topology or layout, protocols implemented, running processes, errors, notifications, alerts, network structure, ongoing communications, data analysis, and so forth.

The design functions 806 can include tools and workflows for managing site profiles, maps, and floor plans, network settings, and IP address management, among others. The policy functions 808 can include tools and workflows for defining and managing network policies. The provisioning functions 810 can include tools and workflows for deploying the network. The assurance functions 812 can use machine learning and analytics to provide end-to-end visibility of the network by learning from the network infrastructure, endpoints, and other contextual sources of information. The platform functions 814 can include tools and workflows for integrating the network management system with other technologies. The base automation functions 816 can include tools and workflows to support the policy functions 808, the provisioning functions 810, the assurance functions 812, and the platform functions 814.

In some embodiments, the design functions 806, the policy functions 808, the provisioning functions 810, the assurance functions 812, the platform functions 814, and the base automation functions 816 can be implemented as microservices in which respective software functions are implemented in multiple containers communicating with each rather than amalgamating all tools and workflows into a single software binary. Each of the design functions 806, policy functions 808, provisioning functions 810, assurance functions 812, and platform functions 814 can be viewed as a set of related automation microservices to cover the design, policy authoring, provisioning, assurance, and cross-platform integration phases of the network lifecycle. The base automation functions 814 can support the top-level functions by allowing users to perform certain network-wide tasks.

Returning to FIG. 8, the controller layer 820 can comprise subsystems for the management layer 820 and may include a network control platform 822, a network data platform 824, and AAA services 826. These controller subsystems can form an abstraction layer to hide the complexities and dependencies of managing many network elements and protocols.

The network control platform 822 can provide automation and orchestration services for the network layer 830 and the physical layer 840, and can include the settings, protocols, and tables to automate management of the network and physical layers. For example, the network control platform 830 can provide the design functions 806, the provisioning functions 808 812. In addition, the network control platform 830 can include tools and workflows for discovering switches, routers, wireless controllers, and other network infrastructure devices (e.g., the network discovery tool); maintaining network and endpoint details, configurations, and software versions (e.g., the inventory management tool); Plug-and-Play (PnP) for automating deployment of network infrastructure (e.g., the network PnP tool), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 822 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 822

The network data platform 824 can provide for network data collection, analytics, and assurance, and may include the settings, protocols, and tables to monitor and analyze network infrastructure and endpoints connected to the network. The network data platform 824 can collect multiple types of information from network infrastructure devices, including Syslog, SNMP, NetFlow, Switched Port Analyzer (SPAN), and streaming telemetry, among others. The network data platform 824 can also collect use contextual information shared from In some embodiments, one or more Cisco DNA™ Center appliances can provide the functionalities of the management layer 810, the network control platform 822, and the network data platform 824. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third-party vendors. The process, as described by some embodiments of the present technology, for conversion of conventional IP-based ACEs into object-group based ACEs may be implemented as part of a DNA™ Center appliance to augment the aforementioned role-based access control mechanism. The Cisco DNA™ Center appliances can also be cloud-tethered to provide for the upgrade of existing functions and additions of new packages and applications without having to manually download and install them.

The AAA services 826 can provide identity and policy services for the network layer 830 and physical layer 840, and may include the settings, protocols, and tables to support endpoint identification and policy enforcement services. The AAA services 826 can provide tools and workflows to manage virtual networks and security groups and to create group-based policies and contracts. The AAA services 826 can identify and profile network infrastructure devices and endpoints using AAA/RADIUS, 802.1X, MAC Authentication Bypass (MAB), web authentication, and EasyConnect, among others. The AAA services 826 can also collect and use contextual information from the network control platform 822, the network data platform 824, and the shared services 850, among others. In some embodiments, Cisco® ISE can provide the AAA services 826.

The network layer 830 can be conceptualized as a composition of two layers, an underlay 834 comprising physical and virtual network infrastructure (e.g., routers, switches, WLCs, etc.) and a Layer 3 routing protocol for forwarding traffic, and an overlay 832 comprising a virtual topology for logically connecting wired and wireless users, devices, and things and applying services and policies to these entities. Network elements of the underlay 834 can establish connectivity between each other, such as via Internet Protocol (IP). The underlay may use any topology and routing protocol.

In some embodiments, the network controller 704 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 832 can be a logical, virtualized topology built on top of the physical underlay 834, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 720, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 720 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 720 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 720. It can be used as source and destination classifiers in Scalable Group ACLs (SGACLs). The SGT can be used to provide address-agnostic group-based policies. Consequently, the Automated (offline) conversion of conventional IP-based Access Control Entries into Object-group based Access control Entries as disclosed by some embodiments of the present technology may provide further improvements to some of functionalities of the DNA-C, such as the micro-segmentation of traffic in a Virtual Network based on object-group access control policy implementation.

In some embodiments, the fabric control plane node 710 may implement the Locator/Identifier Separation Protocol (LISP) to communicate with one another and with the management cloud 702. Thus, the control plane nodes may operate a host tracking database, a map server, and a map resolver. The host tracking database can track the endpoints 730 connected to the network fabric 720 and associate the endpoints to the fabric edge nodes 726, thereby decoupling an endpoint's identifier (e.g., IP or MAC address) from its location (e.g., closest router) in the network.

The physical layer 840 can comprise network infrastructure devices, such as switches and routers 710, 722, 724, and 726 and wireless elements 708 and 728 and network appliances, such as the network controller appliance(s) 704, and the AAA appliance(s) 706.

The shared services layer 850 can provide an interface to external network services, such as cloud services 852; Domain Name System (DNS), DHCP, IP Address Management (IPAM), and other network address management services 854; firewall services 856; Network as a Sensor (Naas)/Encrypted Threat Analytics (ETA) services; and Virtual Network Functions (VNFs) 860; among others. The management layer 802 and/or the controller layer 820 can share identity, policy, forwarding information, and so forth via the shared services layer 850 using APIs.

FIG. 9 illustrates an example of a physical topology for a multi-site enterprise network 900. In this example, the network fabric comprises fabric sites 920A and 920B. The fabric site 920A can include a fabric control node 910A, fabric border nodes 922A and 922B, fabric intermediate nodes 924A and 924B (shown here in dashed line and not connected to the fabric border nodes or the fabric edge nodes for simplicity), and fabric edge nodes 926A-D. The fabric site 920B can include a fabric control node 910B, fabric border nodes 922C-E, fabric intermediate nodes 924C and 924D, and fabric edge nodes 926D-F. Multiple fabric sites corresponding to a single fabric, such as the network fabric of FIG. 9, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 936, traditional WAN 938A, Software-Defined WAN (SD-WAN) (not shown), or Software-Defined Access (SD-Access) 938B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 720). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing the overall scalability of the network.

The control plane in the transit network can hold summary state for all fabric sites that it interconnects. This information can be registered to the transit control plane by a border from different fabric sites. The border nodes can register EID information from the local fabric site into the transit network control plane for summary EIDs only and thus further improve scalability.

The multi-site enterprise network 900 can also include a shared services cloud 932. The shared services cloud 932 can comprise one or more network controller appliances 904, one or more AAA appliances 906, and other shared servers (e.g., DNS; DHCP; IPAM; SNMP and other monitoring tools; NetFlow, Syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

Figure 10:
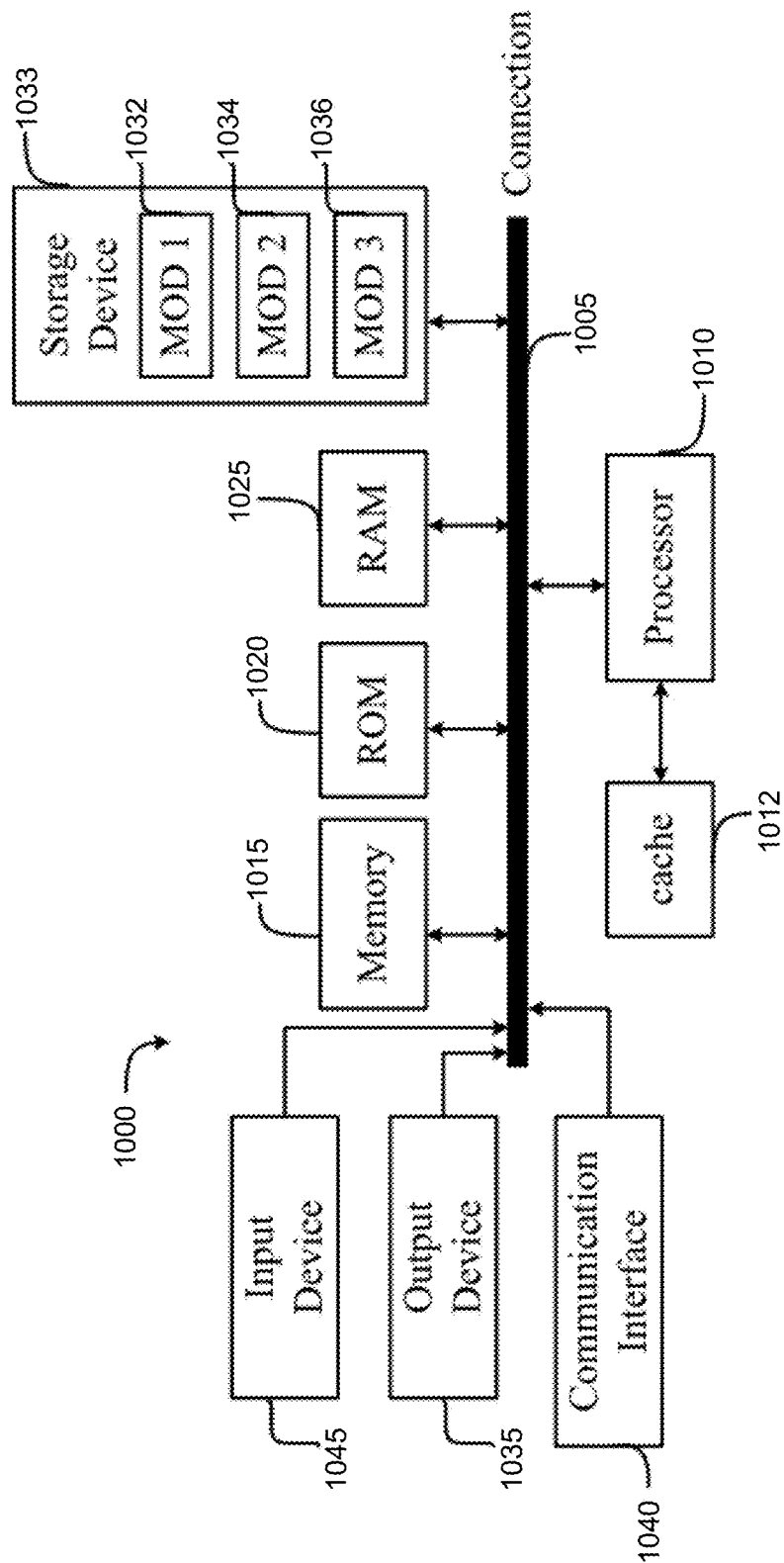
FIG. 10 illustrates an example network device in accordance with some embodiments of the present technology.
Figure 11:
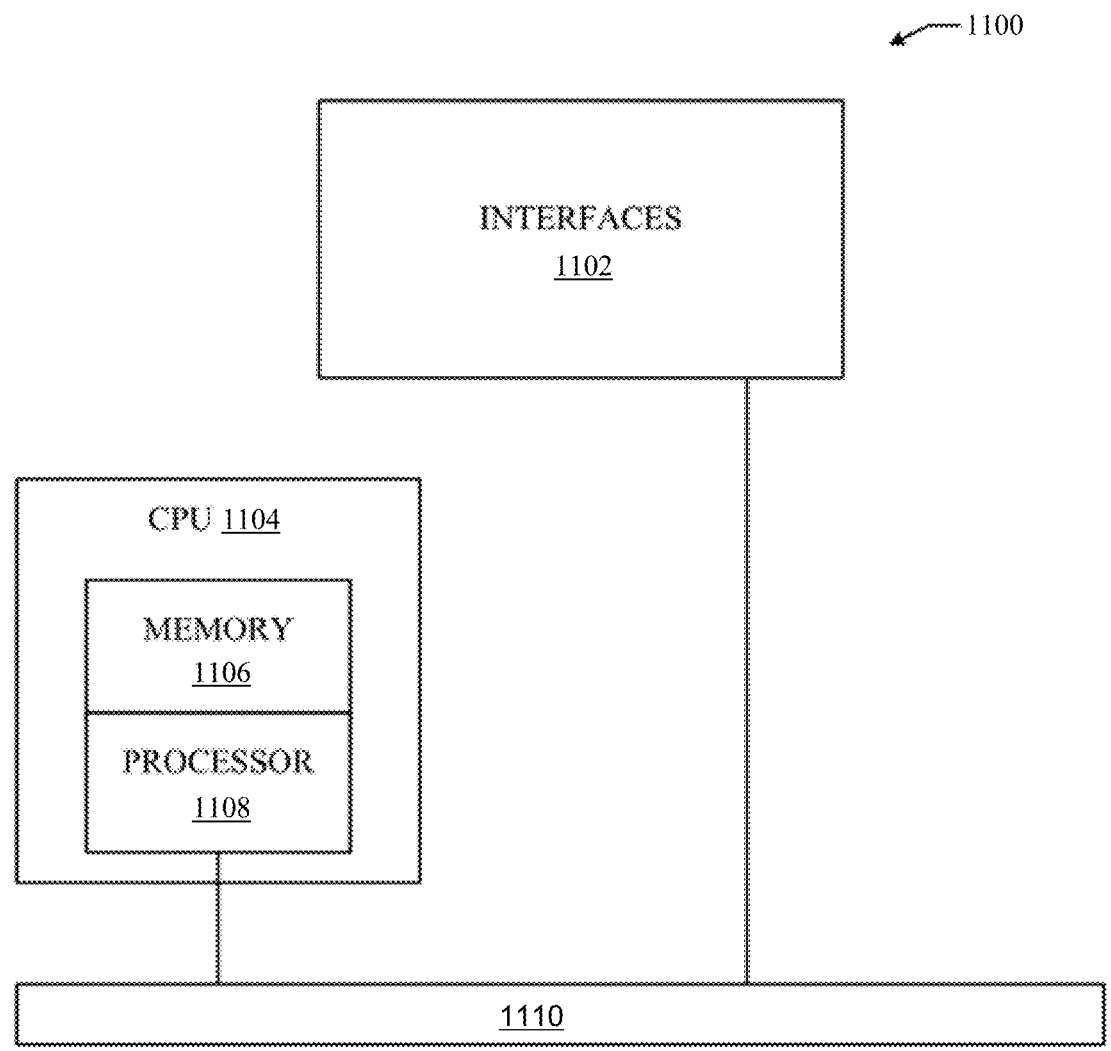
FIG. 11 illustrates an example architecture of a computing device, in accordance with some embodiments of the present technology

The disclosure now turns to FIGS. 10 and 11, which illustrate example architectures of computing and network devices, such as client computers, switches, routers, controllers, servers, and so forth.

FIG. 10 illustrates a computing system architecture 1000 including components in electrical communication with each other using a connection 1005, such as a bus. System 1000 includes a processing unit (CPU or processor) 1010 and a system connection 1005 that couples various system components including the system memory 1015, such as read-only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the actual processor design. The processor 1010 may be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read-only memory (ROM) 1020, and hybrids thereof.

The storage device 1030 can include services 1032, 1034, 1036 for controlling the processor 1010. Other hardware or software modules are contemplated. The storage device 1030 can be connected to the system connection 1005. In one aspect, a hardware module that performs a particular function can include the software component stored in a computer-readable medium in connection with the necessary hardware components, such as the processor 1010, connection 1005, output device 1035, and so forth, to carry out the function.

FIG. 11 illustrates an example network device 1100 suitable for performing switching, routing, assurance, and other networking operations. Network device 1100 includes a central processing unit (CPU) 1104, interfaces 1102, and a connection 1110 (e.g., a PCI bus). When acting under the control of appropriate software or firmware, the CPU 1104 is responsible for executing packet management, error detection, and/or routing functions. The CPU 1104 preferably accomplishes all these functions under the control of software including an operating system and any appropriate applications software. CPU 1104 may include one or more processors 1108, such as a processor from the INTEL X106 family of microprocessors. In some cases, processor 1108 can be specially designed hardware for controlling the operations of network device 1100. In some cases, a memory 1106 (e.g., non-volatile RAM, ROM, TCAM, etc.) also forms part of CPU 1104. However, there are many different ways in which memory could be coupled to the system. In some cases, the network device 1100 can include a memory and/or storage hardware, such as TCAM, separate from CPU 1104. Such memory and/or storage hardware can be coupled with the network device 1100 and its components via, for example, connection 1110.

The interfaces 1102 are typically provided as modular interface cards (sometimes referred to as "line cards"). Generally, they control the sending and receiving of data packets over the network and sometimes support other peripherals used with the network device 1100. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto-processing, and management. By providing separate processors for the communications intensive tasks, these interfaces allow the master microprocessor 1104 to efficiently perform routing computations, network diagnostics, security functions, etc.

Although the system shown in FIG. 11 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 1100.

Regardless of the network device's configuration, it may employ one or more memories or memory modules (including memory 1106) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1106 could also hold various software containers and virtualized execution environments and data.

The network device 1100 can also include an application-specific integrated circuit (ASIC), which can be configured to perform routing, switching, and/or other operations. The ASIC can communicate with other components in the network device 1100 via the connection 1110, to exchange data and signals and coordinate various types of operations by the network device 1100, such as routing, switching, and/or data storage operations, for example.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
grouping a plurality of canonical Access Control entries (ACEs), each comprising a plurality of data fields, into one or more candidate compression groups (CCGs);
identifying, in each of the one or more CCGs, a plurality of equivalent canonical ACEs corresponding to a plurality of mismatching data values across a designated data field and a same data value across a plurality of remaining data fields; and
merging together, in each of the one or more CCGs, the plurality of equivalent canonical ACEs in an iterative manner by varying the designated data field, to thereby convert the plurality of canonical ACEs, in each of the one or more CCGs, into at least one of one or more Object-group based ACEs or one or more Security-group based ACEs.

2. The computer-implemented method of claim 1, wherein each data field from the plurality of data fields corresponds to a non-wildcard value.

3. The computer-implemented method 1, wherein each data field from the plurality of data fields is selected from a group consisting of <action>, <protocol>, <source address>, <source port>, <destination address> and <destination port>.

4. The computer-implemented method of claim 3, wherein a value of a destination address data field corresponds to one or more destination IP addresses.

5. The computer-implemented method of claim 4, further comprising identifying one or more overlapping IP addresses in the destination address data field of one or more neighboring ACEs located in different CCGs from the plurality of CCGs.

6. The computer-implemented method of claim 3, wherein a value of a source address data field corresponds to one or more source IP addresses.

7. The computer-implemented method of claim 6, further comprising identifying one or more overlapping IP addresses in the source address data field of one or more neighboring ACEs located in different CCGs from the plurality of CCGs.

8. The computer-implemented method of claim 1, wherein the method is performed in an offline environment using one or more conventional security policy configurations as input to produce one or more object-group based ACEs as output.

9. The computer-implemented method of claim 1, wherein the one or more Object-group based ACEs or the one or more Security-group based ACEs facilitate an implementation of an access control policy to thereby provide micro-segmentation of traffic in a Virtual Network.

10. A system comprising:
one or more processors; and
at least one computer-readable storage medium having stored therein instructions which, when executed by the one or more processors, cause the one or more processors to:
group a plurality of canonical Access Control entries (ACEs), each comprising a plurality of data fields, into one or more candidate compression groups (CCGs);
identify, in each of the one or more CCGs, a plurality of equivalent canonical ACEs corresponding to a plurality of mismatching data values across a designated data field and a same data value across a plurality of remaining data fields; and
merge together, in each of the one or more CCGs, the plurality of equivalent canonical ACEs in an iterative manner by varying the designated data field, to thereby convert the plurality of canonical ACEs, in each of the one or more CCGs, into one or more Object-group based ACEs.

11. The system of claim 10, wherein each data field from the plurality of data fields is selected from a group consisting of <action>, <protocol>, <source address>, <source port>, <destination address> and <destination port>.

12. The system of claim 11, wherein a value of a source address data field corresponds to one or more source IP addresses.

13. The system of claim 12, further comprising instructions which, when executed by the one or more processors, cause the one or more processors to: identify one or more overlaps in the value of the source address data field corresponding to one or more neighboring ACEs located in different CCGs from the plurality of CCGs.

14. The system of claim 11, wherein a value of a destination address data field corresponds to one or more destination IP addresses.

15. The system of claim 14, further comprising instructions which, when executed by the one or more processors, cause the one or more processors to: identify one or more overlaps in the value of the destination address data field corresponding to one or more neighboring ACEs located in different CCGs from the plurality of CCGs.

16. The system of claim 10, wherein the instructions stored on the at least one computer-readable storage medium are executed by the one or more processors in an offline environment.

17. The system of claim 10, wherein the one or more Object-group based ACEs facilitate an implementation of an access control policy to thereby provide micro-segmentation of traffic in a Virtual Network.

18. At least one non-transitory computer-readable storage medium having stored therein instructions which, when executed by one or more processors, cause the one or more processors to:
group a plurality of canonical Access Control entries (ACEs), each comprising a plurality of data fields, into one or more candidate compression groups (CCGs);
identify, in each of the one or more CCGs, a plurality of equivalent canonical ACEs corresponding to a plurality of mismatching data values across a designated data field and a same data value across a plurality of remaining data fields; and
merge together, in each of the one or more CCGs, the plurality of equivalent canonical ACEs in an iterative manner by varying the designated data field, to thereby convert the plurality of canonical ACEs, in each of the one or more CCGs, into one or more Object-group based ACEs.

19. The at least one non-transitory computer-readable storage medium of claim 18, wherein the instruction are executed by the one or more processors in an offline environment.

20. The at least one non-transitory computer-readable medium of claim 18, wherein the one or more Object-group based ACEs facilitate an implementation of an access control policy to thereby provide micro-segmentation of traffic in a Virtual Network.

* * * * *